US010580548B2

(12) United States Patent
Nishiura et al.

(10) Patent No.: US 10,580,548 B2
(45) Date of Patent: *Mar. 3, 2020

(54) CARBON NANOTUBE COMPOSITE MATERIAL

(71) Applicants: YAZAKI CORPORATION, Tokyo (JP); The University of Tokyo, Tokyo (JP)

(72) Inventors: Ken Nishiura, Shizuoka (JP); Junichiro Tokutomi, Shizuoka (JP); Hideo Gonda, Shizuoka (JP); Jun Yanagimoto, Tokyo (JP)

(73) Assignees: YAZAKI CORPORATION, Tokyo (JP); The University of Tokyo, Tokyo (JP)

( * ) Notice: Subject to any disclaimer, the term of this patent is extended or adjusted under 35 U.S.C. 154(b) by 169 days.

This patent is subject to a terminal disclaimer.

(21) Appl. No.: 15/358,669

(22) Filed: Nov. 22, 2016

(65) Prior Publication Data

US 2017/0148538 A1   May 25, 2017

(30) Foreign Application Priority Data

Nov. 24, 2015  (JP) ................................. 2015-228668

(51) Int. Cl.
*H01B 1/04* (2006.01)
*C01B 32/168* (2017.01)
*B82Y 30/00* (2011.01)

(52) U.S. Cl.
CPC ............. *H01B 1/04* (2013.01); *C01B 32/168* (2017.08); *B82Y 30/00* (2013.01); *Y10S 977/742* (2013.01); *Y10S 977/81* (2013.01); *Y10S 977/932* (2013.01)

(58) Field of Classification Search
CPC .... H01B 1/04; H01B 5/02; H01B 1/02; C01B 32/168; Y10S 977/932; Y10S 977/742; Y10S 977/81; B82Y 30/00
USPC ................................................ 252/503, 514
See application file for complete search history.

(56) References Cited

U.S. PATENT DOCUMENTS

| 8,603,836 | B2 * | 12/2013 | Yoon | B82Y 10/00 |
| | | | | 257/461 |
| 9,362,022 | B2 * | 6/2016 | Kamiyama | B21C 37/047 |
| 2011/0124492 | A1 * | 5/2011 | Loukine | B01J 35/0013 |
| | | | | 502/159 |
| 2012/0256296 | A1 * | 10/2012 | Wei | H01L 29/1606 |
| | | | | 257/607 |
| 2012/0267141 | A1 * | 10/2012 | Kamiyama | B21C 37/047 |
| | | | | 174/102 R |
| 2013/0183439 | A1 * | 7/2013 | Starkovich | H01B 1/04 |
| | | | | 427/113 |
| 2014/0084219 | A1 * | 3/2014 | Zhao | B82Y 30/00 |
| | | | | 252/506 |
| 2014/0141328 | A1 * | 5/2014 | Dai | H01M 4/137 |
| | | | | 429/217 |
| 2015/0023858 | A1 * | 1/2015 | Tour | C01B 21/064 |
| | | | | 423/276 |
| 2017/0018324 | A1 * | 1/2017 | Tokutomi | B82Y 40/00 |
| 2017/0179363 | A1 * | 6/2017 | Hayashi | B82Y 30/00 |

FOREIGN PATENT DOCUMENTS

| JP | 2011-171291 A | 9/2011 | |
| JP | 2014-047093 A | 3/2014 | |
| JP | 2015-199982 A | 11/2015 | |
| WO | WO-2009152146 A1 * | 12/2009 | ............ B82Y 10/00 |
| WO | 2011/090133 A1 | 7/2011 | |
| WO | 2015/156038 A1 | 10/2015 | |

OTHER PUBLICATIONS

Correa-Duarte et al., "Aligning Au Nanorods by Using Carbon Nanotubes as Templates", Angew. Chem. Int. Ed., 2005, 44, 4375-4378. (Year: 2005).*

Vu, "Hybrid Structures of Gold Nanorods and Single-Walled Carbon Nanotubes", submitted to the Faculty of the Graduate College of the Oklahoma State University in partial fulfillment of the requirements for the Degree of Doctor of Philosophy, ProQuest LLC, UMI No. 3460096, May 2011. (Year: 2011).*

Junichiro Tokutomi et al. Hot extrusion to manufacture the metal matrix composite of carbon nanotube and aluminum with excellent electrical conductivities and mechanical properties, CIRP Annals—Manufacturing Technology, Jul. 2015, pp. 257-260, vol. 64. Cited in the JPOA issued on Feb. 13, 2018.

The Japanese office action dated Feb. 13, 2018 in a counterpart Japanese Patent application.

Shi Guo-Xian, Xu Xue-Cheng, Influence of electrical conductivity of multi-walled carbon nanotubes by halogen-doping, Journal of East China Normal University (Natural Science), Article No. 1000-5641 (2013) 06-0120-07, Nov. 2013, p. 120-126, No. 6, Department of Physics, East China Normal University, Shanghai, China. Cited in CNOA issued on Jun. 26, 2018.

The Chinese office action dated Jun. 26, 2018 in a counterpart Chinese patent application.

(Continued)

*Primary Examiner* — Douglas J McGinty
(74) *Attorney, Agent, or Firm* — Metrolexis Law Group, PLLC (57) ABSTRACT

A carbon nanotube composite material (1) includes a metal base material (10) and carbon nanotube electrically-conductive path portions (20). The metal base material (10) is made from a polycrystalline substance in which a plurality of rod-shaped metal crystal grains (11) are oriented in a direction. The carbon nanotube electrically-conductive path portions (20) are made from doped carbon nanotubes having a dopant, existing in parts of grain boundaries (15) between the rod-shaped metal crystal grains (11) in a cross section of the metal base material (10), and forming an electrically-conductive path which is electrically conductive in a longitudinal direction of the metal base material (10), by existing along the longitudinal direction (L).

10 Claims, 6 Drawing Sheets

(56) References Cited

OTHER PUBLICATIONS

The Japanese office action dated Apr. 24, 2018 in a counterpart Japanese Patent application.
An office action dated Feb. 19, 2019 in a counterpart Chinese patent application.
Duclaux, L., "Review of the doping of carbon nanotubes (multiwalled and single-walled)", Carbon, Aug. 2002, pp. 1751-1764, vol. 40, issue 10, Elsevier Science Ltd.; Cited in an Office Action dated Jul. 31, 2019 in the counterpart German patent Application.

* cited by examiner

CARBON NANOTUBE COMPOSITE MATERIAL

CROSS REFERENCE TO RELATED APPLICATIONS

This application claims the priority of Japanese Patent Application No. 2015-228668, filed on Nov. 24, 2015, the entire content of which are incorporated herein by reference.

BACKGROUND

Technical Field

The present invention relates to a carbon nanotube composite material.

Related Art

A conventionally-employed method for increasing the strength of a metal material is to mix a second metal, which is different from a base metal of the metal material, with the metal material. Mixing the second metal with the metal material, however, causes a problem of a great decrease in the electrical conductivity of the metal material.

Against this background, carbon nanotube composite materials have drawn attention. The carbon nanotube composite materials are expected to have a higher strength and a higher electrical conductivity than the metal material because carbon nanotubes have a high strength and exhibit ballistic conduction. Nowadays, a variety of carbon nanotube composite materials are proposed.

Patent Literature JP 2011-171291 A discloses a composite material wire with a cellulation structure which has: partition portions including carbon nanotubes; and intra-partition portions surrounded by the partition portions, and made from an aluminum material or the like. In this composite material wire, a blend ratio of carbon nanotubes to the aluminum material is not less than 0.2% by weight but not greater than 5% by weight.

A method of manufacturing the composite material wire disclosed in Patent Literature JP 2011-171291 A is performed as follows. To begin with, a mixture including aluminum powder, carbon nanotubes and an elastomer is heat-treated to evaporate the elastomer. Thereby, a porous body is obtained. Thereafter, the porous body is plasma-sintered in a can to produce a billet. After that, the billet is molded by being extruded, followed by annealing at 500° C. Thereby, the composite material wire is obtained.

SUMMARY

The composite material wire disclosed in Patent Literature JP 2011-171291 A, however, has a problem of a low electrical conductivity. One may consider that reasons for the low electrical conductivity are an increase in electrical resistance due to the formation of oxide films on surfaces of grains of the aluminum powder, and cavities in the porous body and the billet remaining as voids in the composite material wire.

Furthermore, because of the low electrical conductivity, the composite material wire disclosed in Patent Literature JP 2011-171291 A needs a large amount of carbon nanotubes, the blend ratio of which to the aluminum material is not less than 0.2% by weight but not greater than 5% by weight. Accordingly, the large amount of carbon nanotubes blended leads to a problem of high manufacturing costs.

Moreover, in the composite material wire disclosed in Patent Literature JP 2011-171291 A, the carbon nanotubes have what is termed a cellulation structure. In general, carbon nanotubes are mixture including semiconducting carbon nanotubes and metallic carbon nanotubes, and contact between the semiconducting carbon nanotubes and the metallic carbon nanotubes causes a Schottky contact. In the composite material wire disclosed in Patent Literature JP 2011-171291 A, the cellulation structure in which contact resistance is high because of the Schottky contact is formed in the carbon nanotubes. Accordingly, the composite material wire disclosed in Patent Literature JP 2011-171291 A has the problem of the low electrical conductivity.

The composite material wire disclosed in Patent Literature JP 2011-171291 A further has a problem of a decrease in the electrical conductivity of the carbon nanotubes because the carbon nanotubes are bent and deformed while the aluminum powder and the carbon nanotubes are being compounded.

It should be noted that Patent Literature JP 2011-171291 A describes the use of doped carbon nanotubes, but does not describe anything about what effects the doped carbon nanotubes exert, or why the doped carbon nanotubes need to be used.

The present invention has been made with the foregoing situation taken into consideration. An object of the present invention is to provide a carbon nanotube composite material which has a higher electrical conductivity, and which includes a smaller amount of blended carbon nanotubes.

A carbon nanotube composite material according to an aspect of the present invention includes a metal base material and carbon nanotube electrically-conductive path portions. The metal base material is made from a polycrystalline substance in which a plurality of rod-shaped metal crystal grains are oriented in a direction. The carbon nanotube electrically-conductive path portions are made from doped carbon nanotubes having a dopant, existing in parts of grain boundaries between the rod-shaped metal crystal grains in a cross section of the metal base material, and forming an electrically-conductive path which is electrically conductive in a longitudinal direction of the metal base material, by existing along the longitudinal direction.

The dopant may be at least one dopant selected from the group consisting of a halogen element-containing substance, an alkali metal-containing substance, and a metal oxide.

The halogen element-containing substance may be at least one element selected from the group consisting of fluorine, chlorine, bromine and iodine, ions of the at least one element, or molecules or a chemical compound including the at least one element.

The alkali metal-containing substance may be at least one element selected from the group consisting of lithium, sodium, potassium, rubidium and cesium, ions of the at least one element, or molecules or a chemical compound including the at least one element.

The metal oxide may be at least one oxide selected from the group consisting of iron oxide, copper oxide, titanium oxide, zinc oxide, molybdenum oxide, and calcium oxide.

The doped carbon nanotubes may include 0.04 to 1.6 parts by mass of the dopant relative to 100 parts by mass of the doped carbon nanotubes.

The dopant included in the doped carbon nanotubes may be made to adhere to or contained in carbon nanotubes.

The carbon nanotube composite material may include 0.1 to 1 part by mass of the carbon nanotube electrically-conductive path portions relative to 100 parts by mass of the metal base material.

A carbon nanotube composite material according to the aspect of the present invention has a high electrical conductivity and includes a small amount of blended carbon nanotubes.

DETAILED DESCRIPTION

[Carbon Nanotube Composite Material]

Referring to the drawings, descriptions will be hereinbelow provided for a carbon nanotube composite material of the embodiment.

Figure 1:
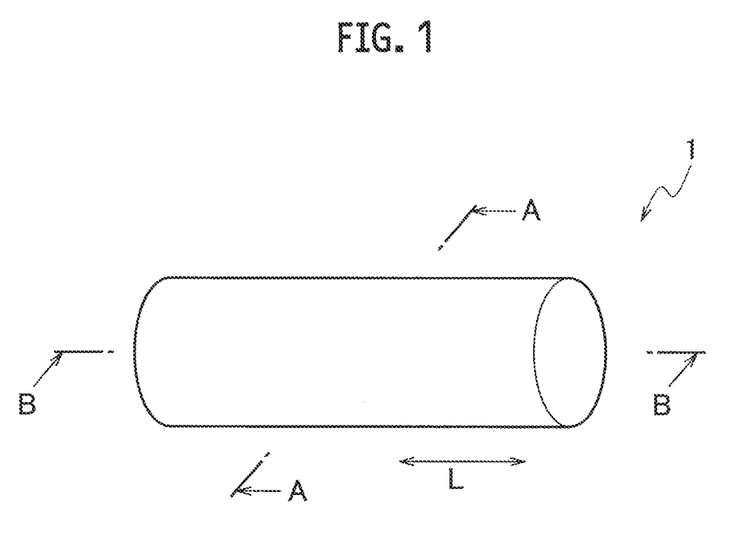
FIG. 1 is a perspective view showing a part of a carbon nanotube composite material of an embodiment.
Figure 2:
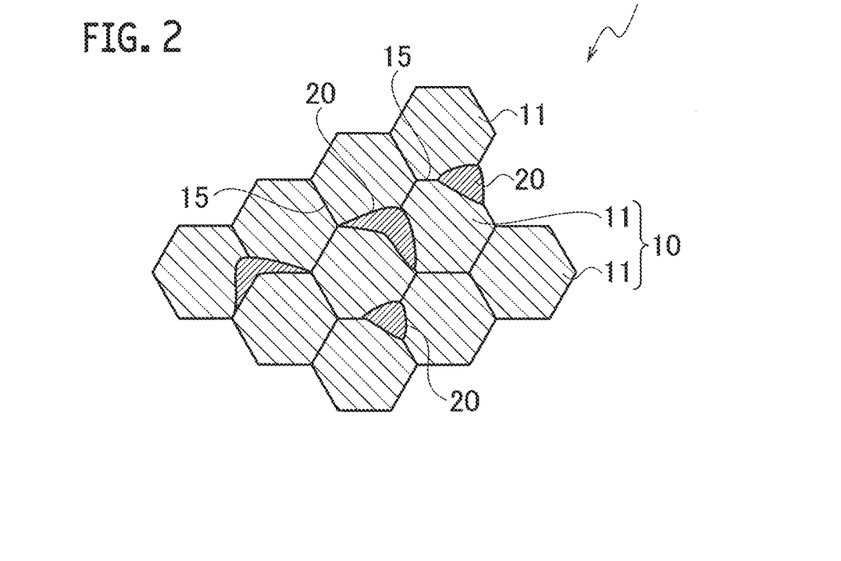
FIG. 2 is a cross-sectional view schematically showing a cross section of the carbon nanotube composite material taken along the A-A line of FIG. 1.
Figure 3:
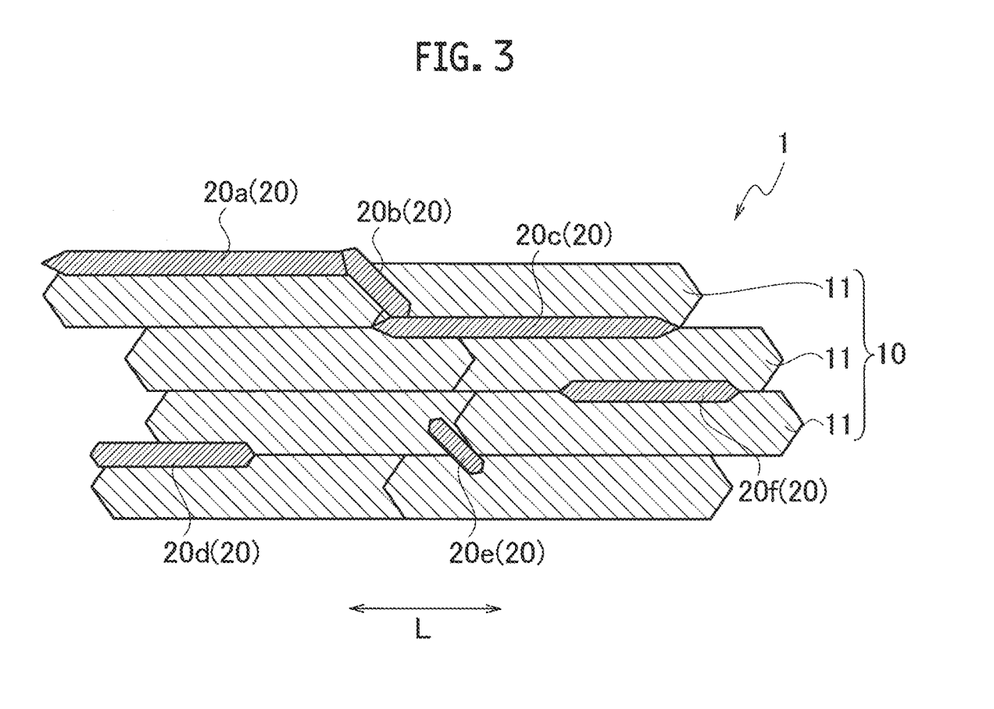
FIG. 3 is a cross-sectional view schematically showing a cross section of the carbon nanotube composite material taken along the B-B line of FIG. 1.

FIG. 1 is a perspective view showing part of the carbon nanotube composite material of the embodiment. It should be noted that the carbon nanotube composite material 1 is a wire extending in a longitudinal direction. FIG. 1 showing only part of the carbon nanotube composite material 1 which is obtained by cutting the carbon nanotube composite material 1 at two ends of the part in the longitudinal direction L. FIG. 2 is a cross-sectional view schematically showing a cross section of the carbon nanotube composite material 1 taken along the A-A line of FIG. 1. FIG. 3 is a cross-sectional view schematically showing a cross section of the carbon nanotube composite material 1 taken along the B-B line of FIG. 1.

As shown in FIGS. 2 and 3, the carbon nanotube composite material 1 of the embodiment includes a metal base material 10 and carbon nanotube electrically-conductive path portions 20.

(Metal Base Material)

The metal base material 10 is made from a polycrystalline substance in which multiple rod-shaped metal crystal grains 11 are oriented in the same direction.

The rod-shaped metal crystal grains 11 are made from a metal such as aluminum, an aluminum alloy, copper or a copper alloy. These metals are desirable for the metal crystal grains because of their high electrical conductivity. It should be noted that the rod-shaped metal crystal grains 11 may include inevitable impurities. The concentration of the inevitable impurities in the rod-shaped metal crystal grains 11 is 10% by mass or less.

In this embodiment according to the present invention, the rod-shaped metal crystal grains 11 mean metal crystal grains each shaped like a rod whose aspect ratio is 1 or greater. The aspect ratio is defined as a ratio of a long side of a metal crystal grain (a longitudinal-direction length of a rod-shaped metal crystal grain) to a short side of the metal crystal grain (a width-direction length of the rod-shaped metal crystal grain). The aspect ratio can be measured using a scanning electron microscope (SEM).

No specific restriction is imposed on the cross-sectional shape of each rod-shaped metal crystal grain 11. Although FIG. 2 shows the rod-shaped metal crystal grains 11 whose cross sections are each shaped like a hexagon, the cross-sectional shapes of the rod-shaped metal crystal grains 11 may be other than hexagonal.

The length of each rod-shaped metal crystal grain 11 is 0.1 to 200 μm, for example. Here, the length of the rod-shaped metal crystal grain 11 means the longitudinal-direction length of the rod-shaped metal crystal grain 11. In addition, a diameter-equivalent grain size of each rod-shaped metal crystal grain 11 is 0.1 to 100 μm, for example. Here, the diameter-equivalent grain size of the rod-shaped metal crystal grain 11 means an average grain size of the cross sections of the rod-shaped metal crystal grain 11. As the length and diameter-equivalent grain size of each rod-shaped metal crystal grain 11 become smaller within their respective above-mentioned ranges, the strength of the metal base material 10 increases.

The metal base material 10 is a polycrystalline substance in which: the multiple rod-shaped metal crystal grains 11 are oriented in the same direction; and each two contiguous rod-shaped metal crystal grains 11 are bonded to each other along a grain boundary. Here, the orientation of the multiple rod-shaped metal crystal grains 11 in the same direction means that the longitudinal directions of the respective rod-shaped metal crystal grains 11 are directed in the same direction.

It should be noted that the carbon nanotube composite material 1 of the embodiment is produced by extrusion in the longitudinal direction L shown in FIGS. 1 and 3. In FIG. 3, the multiple rod-shaped metal crystal grains 11 are oriented in the same direction as the longitudinal direction L is directed.

The reason why like this, the multiple rod-shaped metal crystal grains 11 are oriented in the same direction as the longitudinal direction L is directed is that while the carbon nanotube composite material 1 is being produced, metal crystal grains not oriented in a specific direction are drawn out in a direction which is the same as that of the extrusion.

It should be noted that although the carbon nanotube composite material 1 of the embodiment is produced by extrusion, a carbon nanotube composite material of the present invention may be produced by a method other than extrusion.

(Carbon Nanotube Electrically-conductive Path Portions)

As shown in FIGS. 2 and 3, in the carbon nanotube composite material 1, the carbon nanotube electrically-conductive path portions 20 exist in parts of the grain boundaries 15 between the rod-shaped metal crystal grains 11. The multiple carbon nanotube electrically-conductive path portions 20 are formed in the carbon nanotube composite material 1.

The carbon nanotube electrically-conductive path portions 20 are made from doped carbon nanotubes having dopants, and form an electrically-conductive path which is electrically conductive in the longitudinal direction of the metal base material 10.

<Doped Carbon Nanotubes>

The doped carbon nanotubes forming the carbon nanotube electrically-conductive path portions 20 are carbon nanotubes having dopants. Examples of how the carbon nanotubes have the dopants in the doped carbon nanotubes include the dopants adhering to the carbon nanotubes and the dopants contained in the carbon nanotubes. The doped carbon nanotubes can be obtained by making the dopants adhere to or contained in the publicly-known carbon nanotubes, for example.

[Carbon Nanotubes]

No specific restriction is imposed on the layer structure of the carbon nanotubes as the material of the doped carbon nanotubes. The carbon nanotubes may be multi-layered ones or single-layered ones. Multi-layered carbon nanotubes are preferable over single-layered carbon nanotubes because the multi-layered structure makes it easy for the dopants to adhere to or be contained in the carbon nanotubes than the single-layered structure.

[Dopants]

The dopants included in the doped carbon nanotubes are substances which are made to adhere to or are contained in the carbon nanotubes, and which increases the electrical conductivity of the doped carbon nanotubes. In the embodiment, the dopants included in the doped carbon nanotubes are at least one dopant selected from the group consisting of halogen element-containing substances, alkali metal-containing substances, and metal oxides. The dopants may further include at least one dopant selected from the group consisting of acids, oxidants, electrically-conductive polymers, ionic liquids and organic molecules, in addition to the at least one dopant selected from the groups consisting of the halogen element-containing substances, the alkali metal-containing substances, and the metal oxides, described above.

Examples of the halogen element-containing substances to be used as the dopants include: at least one element selected from the group consisting of fluorine, chlorine, bromine and iodine; ions of the at least one element; and molecules and chemical compounds of the at least one element. Here, the ions conceptually include monoatomic ions and polyatomic ions. In addition, the "chemical compounds of the at least one element" mean poly-elementary substances made from the at least one element and one element of another group in the periodic table. Among the above-mentioned halogen element-containing substances, iodine is the most preferable because it easily adheres to or is contained in the carbon nanotubes. Iodine occurs in states such as $I^-$, $I_3^-$, $I_5^-$ and the like when it adheres to or is contained in the carbon nanotubes. As the above-mentioned halogen element-containing substances, sodium iodide (NaI), copper iodide (CuI), FeI, $FeCl_3$, $MoCl_3$, $CuCl_2$ and $AuCl_3$ are usable as the dopants, for example.

Examples of the alkali metal-containing substances to be used as the dopants include: at least one element selected from the group consisting of lithium, sodium, potassium, rubidium and cesium; ions of the at least one element; and molecules and chemical compounds of the at least one element. An alkali metal easily discharges an electron because of its low electronegativity, and accordingly works as a donor to carbon nanotubes. There are two types of carriers, electrons and holes, which contribute to electrical conduction in a substance. In general, of electrons and holes, electrons are the main carriers in a metal material. Meanwhile, it is known that holes are the main carriers in carbon nanotubes for reasons such as adsorption of oxygen in the atmosphere onto the carbon nanotubes. Contact between different materials with their respective main carries different from each other forms barriers such as a Schottky barrier. In this context, contact between a metal material and carbon nanotubes (CNTs) is highly likely to obstruct the migration of carriers between the metal and the CNTs, and thus to decrease the electrical conductivity. In this case, the use of an alkali metal-containing substance, including an alkali metal, as dopants makes electrons take the place of the main carriers in the carbon nanotubes in the same way as electrons are the main carriers in the metal, and thus to inhibit the decrease in the electrical conductivity which is caused by the formation of the barrier. Accordingly, the use of an alkali metal-containing substance, including an alkali metal, as dopants makes the electrical conductivity of the carbon nanotube composite material easy to become higher. Among the above-mentioned alkali metals, potassium is preferable because it easily adheres to or is contained in the carbon nanotubes, and because its electronegativity is low.

Examples of the metal oxides to be used as the dopants include at least one oxide selected from the group consisting of iron oxide, copper oxide, titanium oxide, zinc oxide, molybdenum oxide and calcium oxide. Examples of the iron oxide to be used as the dopants are $Fe_2O_3$ and $Fe_3O_4$. Examples of the copper oxide to be used as the dopants are $CuO$ and $CuO_2$. An example of the titanium oxide to be used as the dopants is $TiO_2$. An example of the zinc oxide to be used as the dopants is $ZnO$. Examples of the molybdenum to be used as the dopants are $MoO_2$ and $MoO_3$. Among the above-mentioned metal oxides, $MoO_3$ is the most preferable because it easily adheres to or is contained in the carbon nanotubes. Because the work function of any one of the above-mentioned metal oxides is larger than that of the carbon nanotubes, many carriers are generated from the one metal oxide, and are accordingly doped into the carbon nanotubes. For this reason, the use of a metal oxide as the dopants brings about a higher doping effect than the use of any other substance as dopants, even if an amount of the metal oxide as dopants adhering to or contained in the carbon nanotubes is equal to an amount of the other substance as dopants adhering to or contained in the carbon nanotubes.

Examples of the acids as the dopants include: at least one acid selected from the group consisting of sulfuric acid, nitric acid, hydrochloric acid, $PF_6$, $AsF_5$, $BBr_2$ and $SO_3$; and ions of the at least one acid. Examples of the oxidants as the dopants include: at least one chemical compound selected from the group consisting of hydrogen peroxide and potassium permanganate; and ions of the at least one chemical compound. An acid is bonded to defects and the like of the carbon nanotubes. For this reason, the use of an acid as the dopants enables the carriers to move directly between the acid and the carbon nanotubes. Accordingly, a higher doping effect can be obtained from the use of the acid as the dopants. Among the above-mentioned acids, nitric acid has a strong oxidizability, and is easily bonded to the carbon nanotubes. Accordingly, the use of nitric acid as the dopants brings about a high doping effect.

As described above, the dopants may be the at least one dopant selected from the group consisting of the halogen element-containing substances, the alkali metal-containing substances, and the metal oxides. Multiple types of dopants may be used in combination. For example, as such dopants, iodine and sodium may be used in combination, or iodide ions and sodium ions may be used in combination.

The doped carbon nanotubes includes normally 0.04 to 1.6 parts by mass (pts. mass), preferably 0.044 to 1.5 parts by mass, and more preferably 0.044 to 1.2 parts by mass, of the dopants relative to 100 parts by mass of the carbon nanotubes. When the amount of the dopants adhering to or contained in the carbon nanotubes is within the above-mentioned range, the relative electrical conductivity of the carbon nanotube composite material using the doped carbon nanotubes is higher than that of the carbon nanotube composite material using the carbon nanotubes having no dopants.

One may assume that the reason why the electrical conductivity of the carbon nanotube composite material using the doped carbon nanotubes is higher than that of the carbon nanotube composite material using the carbon nanotubes having no dopants is as follows.

In general, the electrical conductivity of a substance is proportional to carrier concentration in the substance. For this reason, one may consider that: because of the adhesion or inclusion of the dopants to or in the carbon nanotubes, the carrier concentration in the doped carbon nanotubes becomes higher than that in the carbon nanotubes having no dopants; and the thus higher carrier concentration raises the electrical conductivity of the doped carbon nanotubes. In this context, it may be considered that the carrier concentration in the carbon nanotube composite material using the doped carbon nanotubes becomes higher than that in the carbon nanotube composite material using the carbon nanotubes having no dopants; and accordingly the thus higher carrier concentration raises the electrical conductivity of the carbon nanotube composite material using the doped carbon nanotubes.

In addition, generally, carbon nanotubes are mixture including semiconducting carbon nanotubes and metallic carbon nanotubes. Furthermore, contact between the semiconducting carbon nanotubes and the metallic carbon nanotubes causes a Schottky contact, and thus increases contact resistance. For this reason, if semiconducting carbon nanotubes and metallic carbon nanotubes are allowed to contact each other as the carbon nanotubes included in the carbon nanotube electrically-conductive path portions 20 in the carbon nanotube composite material 1, a Schottky contact occurs to increase contact resistance, accordingly to decrease the electrical conductivity of the carbon nanotubes. In contrast to this, one may consider that the doped carbon nanotubes obtained by making the dopants adhere to or contained in the carbon nanotubes makes the Schottky contact resistance between the carbon nanotubes lower and the electrical conductivity of the carbon nanotubes accordingly higher than the carbon nanotubes having no dopants. As a result, it may be considered that: the Schottky contact resistance in the carbon nanotube composite material using the doped carbon nanotubes becomes lower than that in the carbon nanotube composite material using the carbon nanotubes having no dopants; and the thus lower Schottky contact resistance raises the electrical conductivity of the carbon nanotube composite material using the doped carbon nanotubes.

It may be considered that as described above, since the doped carbon nanotubes have the dopants, the doped carbon nanotubes cause the effect of increasing the carrier concentration and the effect of decreasing the Schottky contact resistance, and accordingly raises the electrical conductivity of the carbon nanotube composite material. For this reason, normally, it is desirable that an amount of the dopants in the doped carbon nanotubes be larger. To put it specifically, it is desirable that as described above, 0.04 or more parts by mass of the dopants be present relative to 100 parts by mass of the carbon nanotubes.

It should be noted that too large an amount of the dopants in the doped carbon nanotubes shortens an average distance of free travels of the carriers in the doped carbon nanotubes too much, and is more likely to cause a problem of a decrease in the electrical conductivity. For this reason, it is desirable that the amount of the dopants in the doped carbon nanotubes be not too large. To put it specifically, it is desirable that as described above, 1.6 or less parts by mass of the dopants be present relative to 100 parts by mass of the carbon nanotubes.

The diameter of each doped carbon nanotube is 0.4 to 50 nm, for example. The average length of each carbon nanotube is 1 μm or greater, for example.

[Method of Manufacturing Doped Carbon Nanotubes]

The doped carbon nanotubes can be manufactured by making dopants adhere to or contained in the carbon nanotubes, for example. Usable examples of a method of making the dopants adhere to or contained in the carbon nanotubes include electrolysis, vacuum evaporation, steam exposure, solution immersion, and spraying.

The electrolysis is a method of making the dopants in an electrolytic solution including dopant ions adhere to or contained in the carbon nanotubes by causing a potential difference between the carbon nanotubes and the other electrode with the carbon nanotubes immersed in or put in contact with the electrolytic solution.

Figure 4:
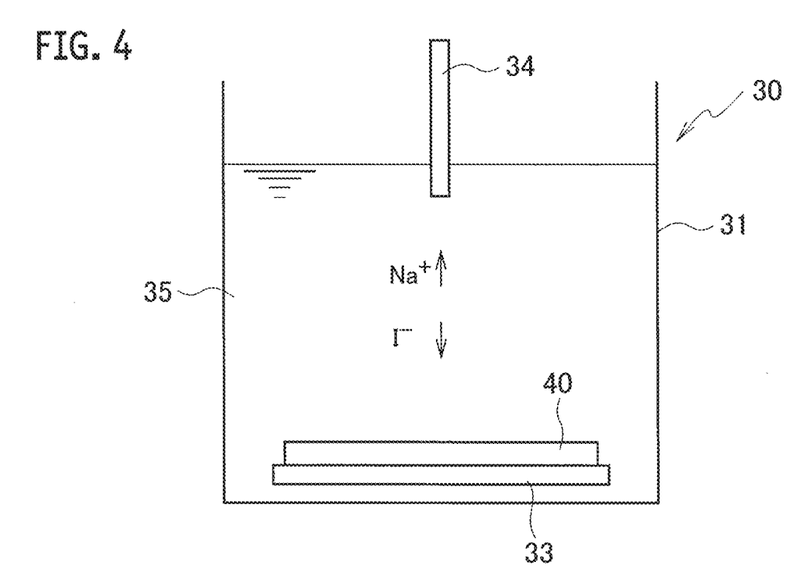
FIG. 4 is a diagram showing an example of how a carbon nanotube is doped.

The electrolysis is performed, for example using an electrolyzer 30 shown in FIG. 4. The electrolyzer 30 includes: an electrolytic bath 31 capable of holding an electrolytic solution 35 including the dopant such as iodine ions; a plate-shaped Pt anode 33 allowing a carbon nanotube 40 to be placed on it; and a Pt cathode 34 capable of electrolyzing the electrolytic solution 35 in cooperation with the Pt anode 33.

Figure 5:
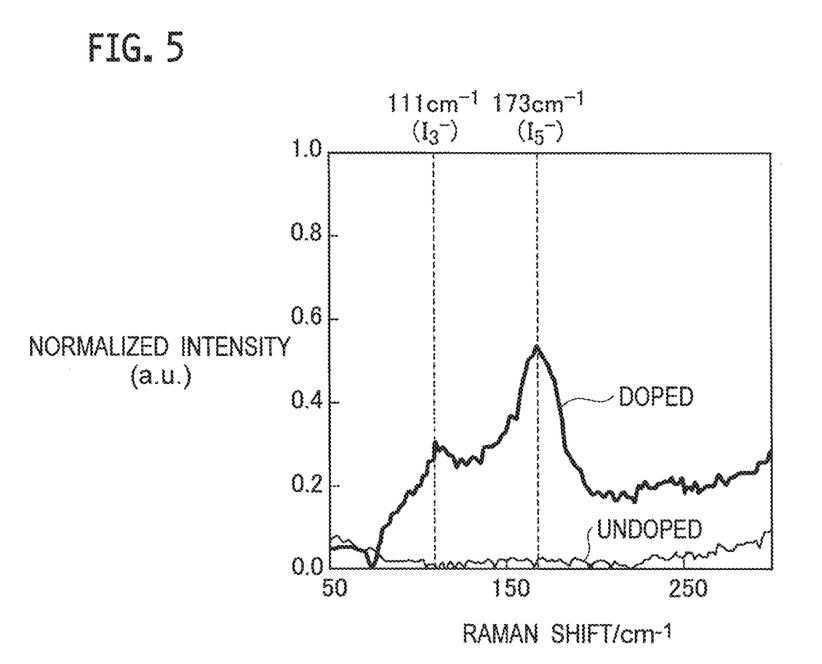
FIG. 5 is a diagram showing an example of Raman spectra of carbon nanotubes measured before and after a doping process.

For example, the electrolytic bath 31 of the electrolyzer 30 is filled with the electrolytic solution 35; the carbon nanotube 40 is placed on the Pt anode 33; and the electrolytic solution 35 is electrolyzed between the Pt cathode 34 and the Pt anode 33. Thereby, the doped carbon nanotubes can be obtained in which the dopants in the electrolytic solution 35 are made to adhere to or contained in the carbon nanotubes. How successfully the dopants adhere to or are contained in the carbon nanotubes can be checked, for example by measuring a Raman spectrum of the carbon nanotubes before and after the electrolytic treatment (doping) as shown in FIG. 5.

The vacuum evaporation is a method of making the dopants adhere to or contained in the carbon nanotubes by vacuum-evaporating the dopants onto the carbon nanotubes. The steam exposure is a method of making the dopants adhere to or contained in the carbon nanotubes by exposing the carbon nanotubes to dopant steam. The solution immersion is a method of making the dopants adhere to or contained in the carbon nanotubes by immersing the carbon nanotubes into a solution including the dopants. The spraying is a method of making the dopants adhere to or contained in the carbon nanotubes by spraying the dopants onto the carbon nanotubes.

It should be noted that no specific restriction is imposed on the shape of the carbon nanotubes to which the dopants are made to adhere, or in which the dopants are contained. For example, the carbon nanotubes may be powder-shaped, fiber-shaped, and sheet-shaped. Publicly-known Buckypaper, for example, is used as a sheet-shaped aggregate of carbon nanotubes. When the dopants adhere to or are contained in the sheet-shaped aggregate of carbon nanotubes, a sheet-shaped aggregate of doped carbon nanotubes is normally obtained. On the other hand, the doped carbon nanotubes to be used in the carbon nanotube composite material of the embodiment are normally powder-shaped. For this reason, the sheet-shaped aggregate of doped carbon nanotubes is made into powder, for example by: immersing the sheet-shaped aggregate of doped carbon nanotubes into a solvent; applying ultrasonic vibrations or the like to the solvent-immersed sheet-shaped aggregate of doped carbon nanotubes to separate the aggregate into individual doped carbon nanotubes; and removing the solvent from the resultant individual doped carbon nanotubes.

<Shape of Doped Carbon Nanotubes in Each Carbon Nanotube Electrically-conductive Path Portion>

Each carbon nanotube electrically-conductive path portion 20 includes at least one doped carbon nanotube. The carbon nanotube electrically-conductive path portion 20 may exist in a way that one, two or more doped carbon nanotubes extend, or in a way that they are agglomerated into masses.

As shown in FIG. 2, in the cross section of the metal base material 10, the carbon nanotube electrically-conductive path portions 20 exist in parts of the grain boundaries 15 between the rod-shaped metal crystal grains 11. In other words, in the cross section of the metal base material 10, the carbon nanotube electrically-conductive path portions 20 do not exist in all of the grain boundaries 15 between the rod-shaped metal crystal grains 11. Thus, no carbon nanotube electrically-conductive path portion 20 has a structure which allows it to cover all the periphery of any rod-shaped metal crystal grain 11. Furthermore, as shown in FIG. 2, in a case where there are multiple carbon nanotube electrically-conductive path portions 20, they normally exist away from one another.

Among known conventional carbon nanotube composite materials is a carbon nanotube matrix example having a cellulation structure in which the peripheries of all the rod-shaped metal crystal grains are covered with the carbon nanotube electrically-conductive path portions. The cellulation structure is that in which the cells formed by the carbon nanotube electrically-conductive path portions are filled with the rod-shaped metal crystal grains. The cellulation structure is normally a honeycomb structure which includes multiple cells, and in which each contiguous two of the cells are bonded to each other while sharing a wall surface. In the cellulation structure, the carbon nanotube electrically-conductive path portions exist in all of the grain boundaries between the rod-shaped metal crystal grains.

In contrast to this, the carbon nanotube composite material 1 of the embodiment is such that in the cross section of the metal base material 10, the carbon nanotube electrically-conductive path portions 20 exist in parts of the grain boundaries 15 between the rod-shaped metal crystal grains 11, but not in all of the grain boundaries 15. For this reason, in the carbon nanotube composite material 1 of the embodiment, no carbon nanotube electrically-conductive path portion 20 forms a cell covering the periphery of any rod-shaped metal crystal grain 11. In this context, the structure of the carbon nanotube composite material 1 of the embodiment is obviously different from the cellulation structure.

As shown in FIG. 3, the carbon nanotube electrically-conductive path portions 20 exist in the longitudinal direction L of the metal base material 10, and thereby form the electrically-conductive path which is electrically conductive in the longitudinal direction L of the metal base material 10. It should be noted that: in the carbon nanotube composite material 1, some of the carbon nanotube electrically-conductive path portions 20 exist continuously in the longitudinal direction L of the metal base material 10; others exist discontinuously in the longitudinal direction L; and the others exist continuously and discontinuously in the longitudinal direction L.

For example, in FIG. 3, three carbon nanotube electrically-conductive path portions 20a, 20b, 20c exist continuously in the longitudinal direction L. Here, "exist continuously" means that each adjacent two of the carbon nanotube electrically-conductive path portions 20 in the longitudinal direction L are in contact with each other.

Furthermore, in FIG. 3, three carbon nanotube electrically-conductive path portions 20d, 20e, 20f exist discontinuously in the longitudinal direction L. Here, "exist discontinuously" means that each adjacent two of the carbon nanotube electrically-conductive path portions 20 in the longitudinal direction L are not in contact with each other.

It should be noted that the carbon nanotube electrically-conductive path portions 20 may be such that at least some of them exist in the longitudinal direction L of the metal base material 10. In other words, all of the carbon nanotube electrically-conductive path portions 20 do not have to exist in the longitudinal direction L of the metal base material 10. For example, in the carbon nanotube composite material 1 of the embodiment, directions in which some others of the carbon nanotube electrically-conductive path portions 20 are oriented do not have to coincide with the longitudinal direction L of the metal base material 10. In this case, directions in which the carbon nanotube electrically-conductive path portions 20 in the carbon nanotube composite material 1 are oriented are at random.

As described above, in the carbon nanotube composite material 1 of the embodiment, the multiple carbon nanotube electrically-conductive path portions 20 do not necessarily exist continuously in the longitudinal direction L of the metal base material 10. However, because the metal base material 10 itself is electrically conductive, the electrical conduction can be established through the metal base material 10 even though the carbon nanotube electrically-conductive path portions 20 are away from one another.

Figure 6:
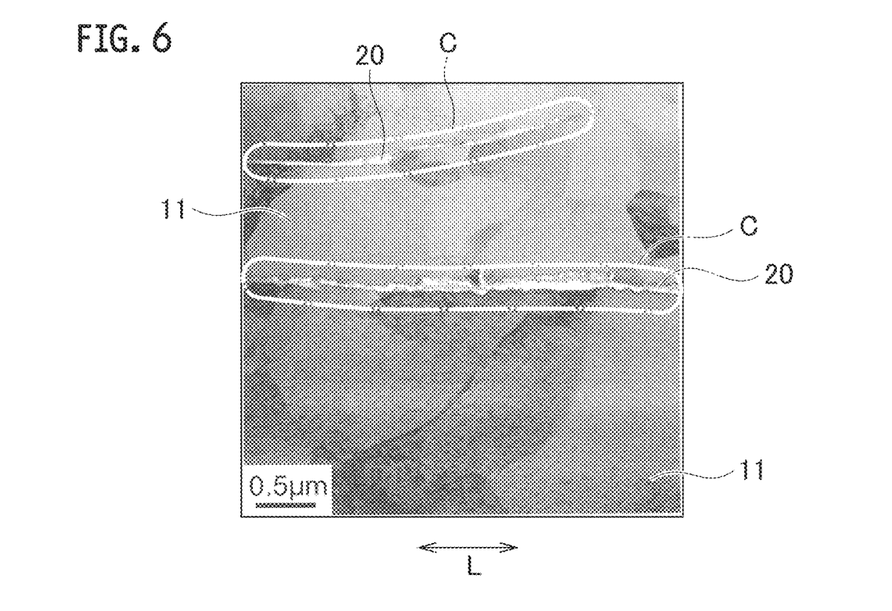
FIG. 6 shows an example of a transmission electron microscope (TEM) photograph of a longitudinal cross section of the carbon nanotube composite material of the embodiment.
Figure 7:
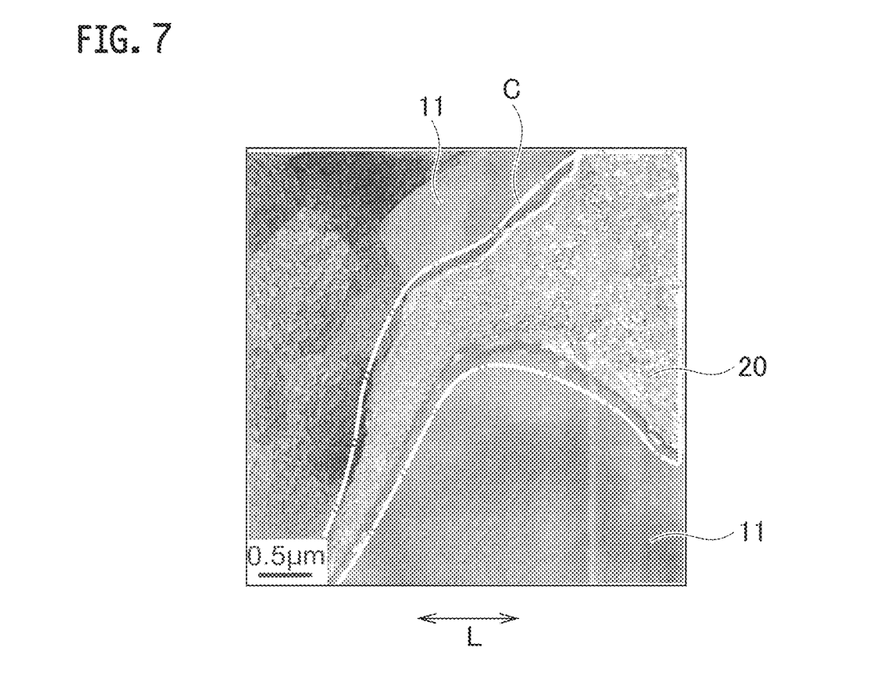
FIG. 7 shows another example of the transmission electron microscope (TEM) photograph of the longitudinal cross section of the carbon nanotube composite material of the embodiment.

FIGS. 6 and 7 show transmission electron microscope (TEM) photographs of a longitudinal cross section of the carbon nanotube composite material of a later-described example 1 which is processed by a focused ion beam (FIB) method. Here, the longitudinal cross section means a cross section of the carbon nanotube composite material extending in the longitudinal direction L. The photographs shown in FIGS. 6 and 7 are taken of the same longitudinal cross section of the same composite material, and what makes the photographs different from each other is a field of view. Incidentally, in FIGS. 6 and 7, areas where carbon nanotube electrically-conductive path portions 20 exist are indicated by the letter C. From FIG. 6, it is learned that between rod-shaped metal crystal grains 11, carbon nanotube electrically-conductive path portions 20 exist discontinuously in the longitudinal direction L. From FIG. 7, it is learned that between rod-shaped metal crystal grains 11, a carbon nanotube electrically-conductive path portion 20 exist bending such that part of the carbon nanotube electrically-conductive path portion 20 extends in the longitudinal direction L while the other part of the carbon nanotube electrically-conductive path portion 20 extends in a direction perpendicular to the longitudinal direction L (downward in FIG. 7).

The amount of the carbon nanotube electrically-conductive path portions 20 included in the carbon nanotube composite material 1 of the embodiment is normally 0.1 to 1 part by mass, preferably 0.2 to 1 part by mass, and more preferably 0.5 to 1 part by mass relative to 100 parts by mass of the metal base material 10. Incidentally, the 100 parts by mass of the metal base material 10 have the same meaning as the 100 parts by mass of the rod-shaped metal crystal grains 11.

When the content of the carbon nanotube electrically-conductive path portions 20 is in the above-mentioned range, the carbon nanotube electrically-conductive path portions 20 are more likely to exist in parts of the grain boundaries 15 between the rod-shaped metal crystal grains 11 in the cross section of the metal base material 10.

It should be noted that in the conventional carbon nanotube composite material having the cellulation structure, carbon nanotube electrically-conductive path portions form wall surfaces of cells. As a result, the content of the carbon nanotube electrically-conductive path portions in the conventional carbon nanotube composite material having the cellulation structure is substantially large, which is around 1 to 5 parts by mass.

In contrast to this, the carbon nanotube composite material 1 of the embodiment does not have the cellulation structure, and serves the purpose if the carbon nanotube electrically-conductive path portions 20 exist in parts of the grain boundaries 15 between the rod-shaped metal crystal grains 11 in the cross section of the metal base material 10. This makes the content of the carbon nanotube electrically-conductive path portions 20 in the carbon nanotube composite material 1 of the embodiment less than the content of the carbon nanotube electrically-conductive path portions in the conventional carbon nanotube composite material having the cellulation structure.

The carbon nanotube composite material 1 of the embodiment has the high electrical conductivity, and has the small quantity of carbon nanotubes blended in it. One may consider that the reasons for the high electrical conductivity of carbon nanotube composite material 1 are twofold as follows. First, the elimination of the cellulation structure from the carbon nanotube composite material 1 makes it unnecessary to use elastomer to manufacture the carbon nanotube composite material 1, and accordingly does not allow residues of otherwise evaporated elastomer to remain in the carbon nanotube composite material 1. Second, since the carbon nanotube electrically-conductive path portions 20 are made from the doped carbon nanotubes having the dopants, the effect of increasing the carrier concentration and the effect of decreasing the Schottky contact resistance are caused in the carbon nanotube composite material 1.

[Method of Manufacturing Carbon Nanotube Composite Material]

Next, referring to the drawings, descriptions will be provided for a method of manufacturing the carbon nanotube composite material of the embodiment.

The method of manufacturing the carbon nanotube composite material of the embodiment includes a doped carbon nanotube fabrication step, a green compact molding step, and an extrusion step.

(Doped Carbon Nanotube Fabrication Step)

The doped carbon nanotube fabrication step is a step of making iodine as the dopants adhere to or contained in the carbon nanotubes. The doped carbon nanotube fabrication step is the same as the method of manufacturing the doped carbon nanotubes which has been described above. For this reason, descriptions for the step will be omitted.

(Green Compact Molding Step)

The green compact molding step is a step of molding mixed powder including metal powder and doped carbon nanotubes into a powder green compact by applying pressure to the mixed powder.

<Metal Powder>

Examples of the metal powder to be used include aluminum powder, aluminum alloy powder, copper powder, and copper alloy powder. These metal powders are preferable because of their higher electrical conductivity. The average particle diameter $D_{50}$ of the metal powder is for example 1 to 500 μm, and preferably 3 to 300 μm. Here, $D_{50}$ means a median diameter. When the average particle diameter $D_{50}$ of the metal powder is within in the above-mentioned range, the carbon nanotube composite material 1 of the embodiment can be obtained easily. Further, the metal powder may be a mixture of multiple types of metal powders with different average particle diameters $D_{50}$. When the metal powder is a mixture of multiple types of metal powders with different average particle diameters $D_{50}$, the powder green compact can be molded easily because the interstices between grains of the metal powder are smaller.

<Doped Carbon Nanotubes>

The doped carbon nanotubes to be used are the same as what are used in the carbon nanotube composite material of the embodiment. It should be noted that the carbon nanotubes to be used as a material of the doped carbon nanotubes may be prepared by removing metal catalysts such as platinum catalysts and amorphous carbon from the carbon nanotubes though acid cleaning, or by graphitizing amorphous carbon through high-temperature treatment, before the dopants are made to adhere to or contained in the carbon nanotubes. The pre-treatments of the carbon nanotubes like this make it possible to increase the purity and crystallinity of the obtained doped carbon nanotubes. What else should be taken into consideration is the same as what has been explained for the carbon nanotube composite material of the embodiment. For this reason, more descriptions for the doped carbon nanotubes will be omitted.

<Mixed Powder>

The mixed powder is the powder including the metal powder and the doped carbon nanotubes. The mixed powder can be obtained, for example, by mixing the metal powder and the doped carbon nanotubes in a solvent such as an alcohol-based solvent, and vaporizing the solvent.

The amount of the doped carbon nanotubes included in the mixed powder is normally 0.1 to 1 part by mass, preferably 0.2 to 1 part by mass, and more preferably 0.25 to 1 part by mass relative to 100 parts by mass of the metal powder.

In the green compact molding step, the mixed powder is compacted by applying pressure to the mixed powder, and thereby is molded into the powder green compact. In the green compact molding step, the mixed powder is compacted in a way that the interstices between the grains of the metal powder in the mixed powder are minimized. The application of the pressure to the mixed powder may be achieved using a publicly-known method. According to this method, for example, the mixed powder is placed in a cylinder-shaped green compact molding container, and thereafter, pressure is applied to the mixed powder inside the container.

In the obtained powder green compact, the doped carbon nanotubes normally exist in the interstices between the grains of the compacted metal powder. The doped carbon nanotubes may exist in a way that one, two or more doped carbon nanotubes extend. Otherwise, the doped carbon nanotubes may be agglomerated into masses as long as they exist in the interstices between the grains of the metal powder.

Figure 8:
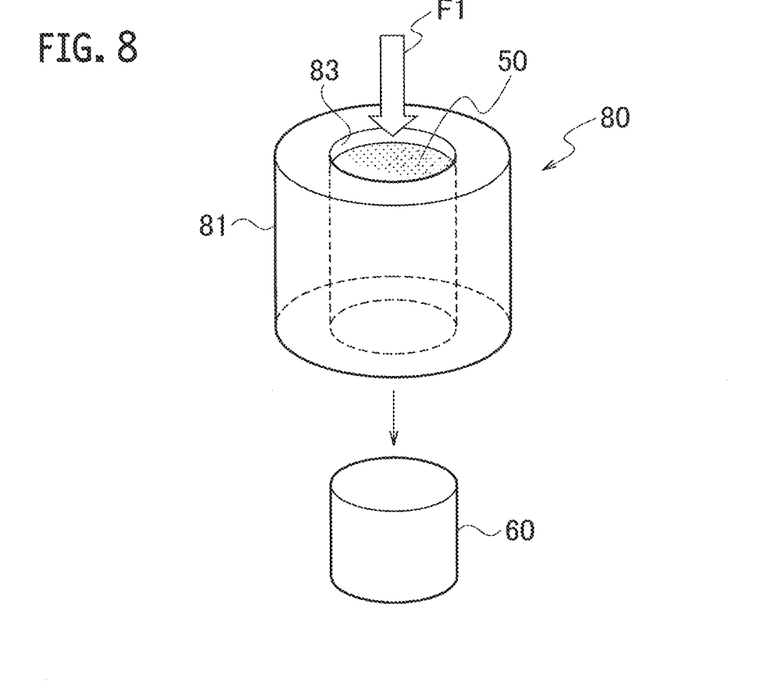
FIG. 8 is a diagram showing an example of a green compact molding step.

Referring to the drawing, descriptions will be provided for the green compact molding step. FIG. 8 is a diagram showing an example of the green compact molding step. A green compact molding container 80 shown in FIG. 8 is a container configured to mold mixed powder 50 into a powder green compact 60 by applying pressure to the mixed powder 50. The green compact molding container 80 includes a cylinder-shaped container main body 81 which is provided with a column-shaped hollow portion 83 penetrating through the container main body 81 in the axis direction.

The green compact molding step starts with the placement of the green compact molding container 80 onto a bottom plate (not illustrated). In this case, the green compact molding container 80 is placed onto the bottom plate with no gap between the bottom surface of the green compact molding container 80 and the upper surface of the bottom plate. Thereafter, the mixed powder 50 is placed into the hollow portion 83 of the green compact molding container 80 whose bottom portion is closed by the bottom plate. After that, the mixed powder 50 inside the hollow portion 83 is compacted by applying pressure to the mixed powder 50 using force denoted by reference sign F1. Thereby, the mixed powder 50 is molded into the powder green compact 60.

The pressure to be applied to the mixed powder 50 using the force denoted by reference sign F1 in the green compact molding step should be set not less than yield stress, but not greater than maximum stress, of the metal powder in the mixed powder 50. For example, in a case where the metal powder in the mixed powder 50 is the aluminum powder, the pressure to be applied to the mixed powder 50 is not less than the yield stress, but not greater than the maximum stress, of the aluminum powder. When the pressure to be applied to the mixed powder 50 is not less than the yield stress, but not greater than the maximum stress, of the metal powder in the mixed powder 50, the mixed powder 50 is molded into the powder green compact 60 by compacting the mixed powder 50 in the way that the interstices between the grains of the metal powder in the mixed powder 50 are minimized.

Here, the yield stress means stress at a boundary point between elastic deformation and plastic deformation. To put it specifically, generally speaking, a metal material such as metal powder has a property in which: in a range where an amount of strain is small, stress increases in proportion to an increase in the strain (elastic deformation); and once the strain exceeds a certain amount, the stress no longer increases in proportion to the increase in the strain (plastic deformation). The stress corresponding to the certain amount of strain is referred to as the yield stress. Meanwhile, the maximum stress means a maximum value of the stress which is in both the elastic deformation range and the plastic deformation range. The maximum stress of a metal material normally exists in the plastic deformation range.

Figure 9:
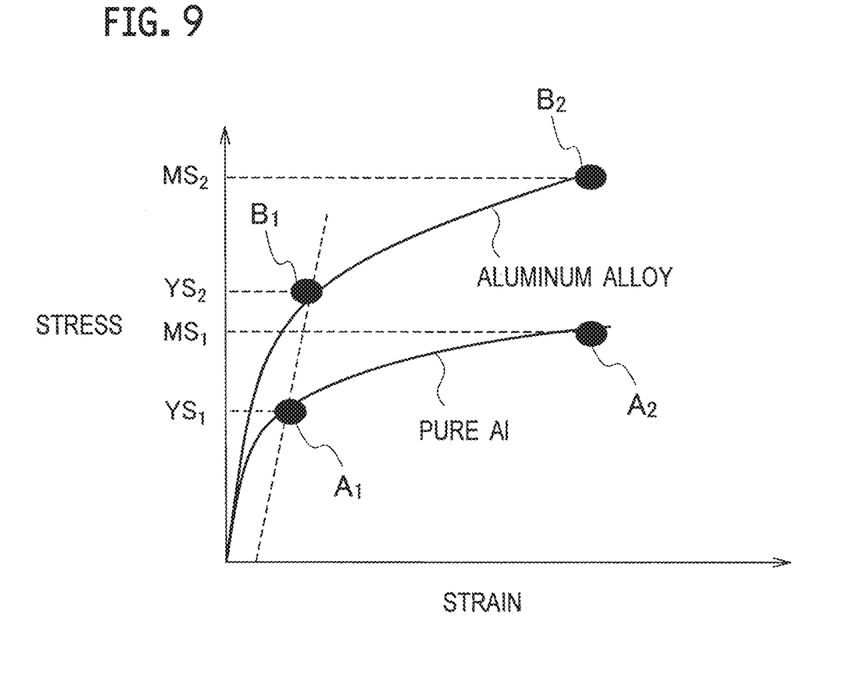
FIG. 9 is a diagram for explaining a range of pressure to be applied to mixed powder in the green compact molding step.

Referring to the drawing, descriptions will be provided in the respect that the pressure to be applied to the mixed powder 50 is not less than the yield stress, but not greater than the maximum stress, of the metal powder in the mixed powder 50. FIG. 9 is a diagram for explaining a range of the pressure to be applied to the mixed powder in the green compact molding step. To put it specifically, FIG. 9 is a graph showing a stress-strain curve exhibited by the metal powder of pure Al (aluminum), and a stress-strain curve exhibited by the metal powder of aluminum alloy. Incidentally, the stress-strain curves in FIG. 9 are on a semi-log graph in which an axis representing the stress is logarithmically scaled.

In the case of the metal powder of pure Al (aluminum), the yield stress is $YS_1$ which is stress at a point $A_1$, and the maximum stress is $MS_1$ which is stress at a point $A_2$, as shown in FIG. 9. With these taken into consideration, in the case where the metal powder included in the mixed powder 50 is made of pure Al (aluminum), the pressure to be applied to the mixed powder 50 in the green compact molding step is set not less than the yield stress $YS_1$, but not greater than the maximum stress $MS_1$. Incidentally, the stress-strain curve of pure Al in FIG. 9 is curved in a range where the strain is not greater than the point $A_1$. This range is the elastic deformation range where the stress increases in proportion to the increase in the strain. The reason why the stress-strain curve is curved in this range is that FIG. 9 employs the semi-log graph.

In the case of the metal powder of aluminum alloy, the yield stress is $YS_2$ which is stress at a point $B_1$, and the maximum stress is $MS_2$ which is stress at a point $B_2$. With these taken into consideration, in the case where the metal powder included in the mixed powder 50 is made of aluminum alloy, the pressure to be applied to the mixed powder 50 in the green compact molding step is set not less than the yield stress $YS_2$, but not greater than the maximum stress $MS_2$. Incidentally, the stress-strain curve of aluminum alloy in FIG. 9 is curved in a range where the strain is not greater than the point $B_1$. This range is the elastic deformation range as in the case of the range in the stress-strain curve of pure Al where the strain is not greater than the point $A_1$.

A process of applying the pressure to the mixed powder 50 in the green compact molding step is normally performed at room temperature. In addition, a length of time needed to apply the pressure to the mixed powder 50 in the green compact molding step is normally 5 to 60 seconds, and preferably 10 to 40 seconds. The step can reduce the length of time needed to apply the pressure to the mixed powder 50 to a very short time, since the mixed powder 50 includes no organic matter such as an elastomer which requires heat treatment for several hours, and since the green compact molding step employs the physical process of molding the mixed powder 50 into the powder green compact 60 by compacting the mixed powder 50.

Once the pressure within the predetermined range is applied to the mixed powder 50 in the green compact molding step, the mixed powder 50 is molded into the powder green compact 60 inside the hollow portion 83 of the green compact molding container 80. The powder green compact 60 is discharged from the hollow portion 83 of the green compact molding container 80, for example by being pushed out. The obtained powder green compact 60 is supplied to the subsequent step, that is to say, the extrusion step.

(Extrusion Step)

The extrusion step is a step of extruding the powder green compact 60 in a vacuum atmosphere, at a temperature of 400° C. or higher, and at a strain rate of 0.1 to 100 s$^{-1}$.

Figure 10:
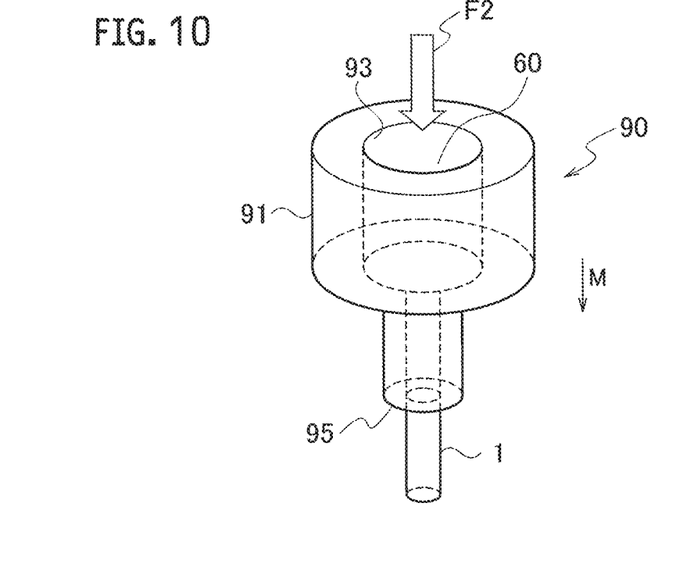
FIG. 10 is a diagram showing an example of an extrusion step.

In the extrusion step, the carbon nanotube composite material 1 is obtained by heating and extruding the powder green compact 60. The extruding of the powder green compact 60 can be achieved using a publicly-known method. For example, after placing the powder green compact 60 into a cylinder-shaped extruder, the powder green compact 60 inside the container is heated and extruded.

Referring to the drawing, descriptions will be provided for the extrusion step. FIG. 10 is a diagram showing an example of the extrusion step. An extruder 90 shown in FIG. 10 is an apparatus configured to mold the powder green compact 60 into the carbon nanotube composite material 1 by heating and extruding the powder green compact 60. The extruder 90 includes: a cylinder-shaped apparatus main body 91 provided with a column-shaped hollow portion 93 into which to insert the powder green compact 60; and a die 95 which is provided to a bottom portion of the apparatus main body 91, and out of which an extruded product is discharged.

In the extrusion step, the powder green compact 60 inserted in the hollow portion 93 of the extruder 90 is heated in a vacuum atmosphere. Thereafter, force denoted by reference sign F2 is applied to the thus-heated powder green compact 60. Thereby, the extruded product is pushed out of the die 95 in an extrusion direction M. Incidentally, the atmosphere may be an inert gas atmosphere instead of the vacuum atmosphere.

The powder green compact 60 is heated in a way that the temperature of the powder green compact 60 is normally 400° C. or higher, preferably 400 to 700° C., more preferably 400 to 660° C., and much more preferably 400 to 650° C. When the temperature of the powder green compact 60 is less than 400° C., the extrusion is difficult. On the other hand, when the temperature of the powder green compact 60 is greater than 660° C., there is likelihood that aluminum carbide is generated in the carbon nanotube composite material 1.

Furthermore, the powder green compact 60 is heated in a way that a length of time for which the temperature of the powder green compact 60 is within the above-mentioned temperature range is normally 0.3 to 5 minutes, and preferably 0.5 to 3 minutes. In this step, the powder green compact 60 includes no organic matter such as an elastomer which requires heat treatment for several hours, and the carbon nanotube composite material 1 obtained in this step has no cellulation structure. For these reasons, the step can reduce the length of time needed to heat the powder green compact 60 to a very short time.

The strain rate of the heated powder green compact 60 during the extrusion is normally 0.1 to 100 s$^{-1}$, and preferably 0.3 to 3 s$^{-1}$. The strain rate within this range makes the obtained carbon nanotube composite material 1 have the structure and properties of the carbon nanotube composite material of the embodiment.

The extrusion ratio during the extrusion is normally at 4:1 or greater. When the extrusion ratio is less than 4:1, there is likelihood that the powder green compact 60 is sintered insufficiently. Here, the extrusion ratio means a ratio of an area of the cross section of the powder green compact 60 to an area of the cross section of the carbon nanotube composite material 1 as the extruded material.

The carbon nanotube composite material 1 obtained through the extrusion described above has the same structure as does the carbon nanotube composite material 1 of the embodiment. For this reason, descriptions for the carbon nanotube composite material 1 will be omitted.

The method of manufacturing the carbon nanotube composite material of the embodiment makes it possible to manufacture the carbon nanotube composite material with the higher electrical conductivity and the smaller quantity of carbon nanotubes blended therein in the shorter time. Incidentally, one may consider that the reasons for the higher electrical conductivity of the carbon nanotube composite material 1 is that the elimination of the cellulation structure from the carbon nanotube composite material 1 makes it unnecessary to use elastomer to manufacture the carbon nanotube composite material 1, and accordingly does not allow residues of otherwise evaporated elastomer to remain in the carbon nanotube composite material 1. Meanwhile, one may consider that the reason why the carbon nanotube composite material 1 can be manufactured in the shorter time is that the unnecessariness of the elastomer evaporation makes it possible to manufacture the carbon nanotube composite material 1 in about 2 minutes, inclusive of the green compact molding step and the extrusion step.

EXAMPLES

More detailed descriptions will be hereinbelow provided for the present invention using examples and comparative examples. Incidentally, the present invention is not limited to these examples.

Example 1

(Step of Producing Doped Carbon Nanotubes)
<Pre-treatment>

To begin with, the carbon nanotubes 40 each with a diameter of approximately 15 nm, and with an average length of approximately 5 µm were prepared. As the carbon nanotubes 40, a beforehand-molded nonwoven fabric-shaped aggregate of the carbon nanotubes 40, or a Buckypaper, was used. The fabric-shaped aggregate of the carbon nanotubes (Buckypaper) 40 was 0.3 mm in thickness. Subsequently, the fabric-shaped aggregate of the carbon nanotubes 40 was immersed in a mixed acid including concentrated nitric acid and concentrated sulfuric acid for 24 hours. This immersion treatment was performed as a pre-treatment for removing metal catalysts and amorphous carbon which had remained in the carbon nanotubes 40.

<Electrolytic Treatment>

After that, the electrolytic treatment for making iodine as the dopants adhere to or contained in the carbon nanotubes was performed using the electrolyzer 30 shown in FIG. 4. The electrolyzer 30 included: the electrolytic bath 31 capable of holding the electrolytic solution 35 including iodine ions; the plate-shaped Pt anode 33 allowing a carbon nanotubes 40 to be placed on it; and the Pt cathode 34 capable of electrolyzing the electrolytic solution 35 in cooperation with the Pt anode 33.

To begin with, the electrolytic bath 31 of the electrolyzer 30 is filled with a NaI aqueous solution 35 as the electrolytic solution, and the nonwoven fabric 40 made from the carbon nanotubes was placed on the plate-shaped Pt anode 33 arranged in the bottom portion of the electrolytic bath 31. The NaI aqueous solution 35 was an electrolytic solution including $Na^+$; and $I^-$.

Subsequently, the Pt cathode 34 was immersed in the NaI aqueous solution 35, and the NaI aqueous solution 35 was potentiostatically electrolyzed with a 0.7-volt potential difference obtained by setting the electric potential of the Pt cathode 34 at 0 volts; and setting the electric potential of the Pt anode 33 at 0.7 volts. For the electrolysis, the temperature of the NaI aqueous solution 35 was set at 25° C. This electrolysis was performed in order that iodine ions $I^-$ in the NaI aqueous solution 35 were attracted by the Pt anode 33, and accordingly were made to adhere to or contained in the carbon nanotubes in the Buckypaper 40. Furthermore, the conditions for the electrolysis were set such that 10 parts by mass of iodine adhered to 100 parts by mass of the carbon nanotubes in the Buckypaper 40 after the electrolysis (doping).

Part of the electrolytically-treated Buckypaper 40 was put into DMF (N,N-dimethylformamide), and was separated into individual doped carbon nanotubes by applying ultrasonic vibrations to the part of the Buckypaper 40. Then, the DMF was evaporated, and powder of electrolytically-treated carbon nanotubes was thereby obtained. Another Buckypaper 40 not yet having been electrolytically-treated was processed in the same manner, and powder of carbon nanotubes not yet having been electrolytically-treated was obtained.

A Raman spectrum of the powder of the electrolytically-treated carbon nanotubes, and a Raman spectrum of the powder of the carbon nanotubes not yet having been electrolytically-treated were analyzed. As a result, as shown in FIG. 5, it was detected that the electrolytically-treated (doped) carbon nanotubes had a peak at 111 cm$^{-1}$ ($I_3^-$) and a peak at 173 cm$^{-1}$ ($I_5^-$) which the carbon nanotubes not yet having been electrolytically-treated (undoped) did not have. From the result shown in FIG. 5, it was learned that the electrolytically-treated (doped) carbon nanotubes included iodine occurring in a state of $I_3^-$ and iodine occurring in the state of $I_5^-$.

(Green Compact Molding Step)

To begin with, one part by mass of the electrolytically-treated Buckypaper 40 was put into DMF (N,N-dimethylformamide), and was separated into individual doped carbon nanotubes by applying ultrasonic vibrations to the Buckypaper 40. Thereby, the doped carbon nanotubes were obtained. Next, 100 parts by mass of aluminum powder with a purity of 99.9%, and with an average particle diameter $D_{50}$ of 50 μm was added, and mixed in the DMF. Thereafter, the DMF was evaporated, and mixed powder including the aluminum powder and the doped carbon nanotubes was prepared.

Thereafter, the mixed powder was placed into the hollow portion 83 of the green compact molding container 80 shown in FIG. 8, and pressure was applied to the mixed powder at room temperature (20° C.) for 20 seconds. Incidentally, the pressure not less than the yield stress, but not greater than the maximum stress, of the aluminum powder in the mixed powder was applied to the mixed powder. As a result of this, a powder green compact was molded in the hollow portion 83 of the green compact molding container 80.

(Extrusion Step)

Furthermore, the powder green compact was placed into the hollow portion 93 of the extruder 90 shown in FIG. 10, and was held in a vacuum atmosphere for approximately 2 minutes with the temperature of the die 95 set at 500° C. Thereafter, the powder green compact was extruded. The extrusion was performed with a strain rate of 1 s$^{-1}$, and with an extrusion ratio of 4:1.

After the extrusion, the carbon nanotube composite material was obtained. The obtained carbon nanotube composite material included: the metal base material made from the polycrystalline substance in which the multiple rod-shaped metal crystal grains were oriented in the same direction; and the carbon nanotube electrically-conductive path portions formed from the doped carbon nanotubes. In the cross section of the metal base material, the carbon nanotube electrically-conductive path portions exist in parts of the grain boundaries between the rod-shaped metal crystal grains. In addition, the carbon nanotube electrically-conductive path portions exist in the longitudinal direction of the metal base material. Thus, the carbon nanotube electrically-conductive path portions form the electrically-conductive path which is electrically conductive in the longitudinal direction of the metal base material.

FIGS. 6 and 7 show transmission electron microscope (TEM) photographs of the longitudinal cross section of the obtained carbon nanotube composite material which was processed by the focused ion beam (FIB) method. Here, the longitudinal cross section means the cross section of the carbon nanotube composite material extending in the longitudinal direction L. The photographs shown in FIGS. 6 and 7 were taken of the same longitudinal cross section of the same composite material, and what made the photographs different from each other was a field of view. Incidentally, in FIGS. 6 and 7, areas where carbon nanotube electrically-conductive path portions 20 existed are indicated by the letter C.

From FIG. 6, it is learned that between rod-shaped metal crystal grains 11, carbon nanotube electrically-conductive path portions 20 existed discontinuously in the longitudinal direction L. From FIG. 7, it is learned that between rod-shaped metal crystal grains 11, a carbon nanotube electrically-conductive path portion 20 existed bending such that part of the carbon nanotube electrically-conductive path portion 20 extended in the longitudinal direction L while the other part of the carbon nanotube electrically-conductive path portion 20 extended in a direction perpendicular to the longitudinal direction L (downward in FIG. 7).

(Evaluation)

<Amount of Doped Carbon Nanotubes in Carbon Nanotube Composite Material>

An amount of the doped carbon nanotubes in the obtained carbon nanotube composite material was measured using combustion-infrared absorption spectroscopy. The carbon nanotube composite material of Example 1 included 1 part by mass of the doped carbon nanotubes relative to 100 parts by mass of the aluminum forming the rod-shaped metal crystal grains 11. The measurement results are shown in Table 1.

TABLE 1

| | | Carbon Nanotube Composite material or Metal Material | | | |
|---|---|---|---|---|---|
| | | Doped Carbon Nanotubes | | | |
| | Metal Powder Type | Content of Doped CNT*1 Relative to Metal (parts by mass) | Dopant Type | Amount of Dopants Doped into CNT*1 (parts by mass) | Relative Electrical conductivity |
| Example 1 | Al Powder (99.9% purity) | 1 | Iodine | 1.5 | 1.04 (value relative to Comparative Example 1) |
| Example 2 | Al Powder (99.9% purity) | 0.5 | Iodine | 0.044 | 1.03 (value relative to Comparative Example 2) |
| Example 3 | Al Powder (99.9% purity) | 0.5 | Iodine | 1.2 | 1.02 (value relative to Comparative Example 2) |
| Comparative Example 1 | Al Powder (99.9% purity) | 1 | Iodine | 0 | 1.00 |
| Comparative Example 2 | Al Powder (99.9% purity) | 0.5 | Iodine | 0 | 1.00 |
| Example 4 | Al Powder (99.9% purity) | 0.5 | Iodine | 0.002 | 0.86 (value relative to Comparative Example 2) |
| Example 5 | Al Powder (99.9% purity) | 0.5 | Iodine | 0.014 | 0.91 (value relative to Comparative Example 2) |
| Example 6 | Al Powder (99.9% purity) | 0.5 | Iodine | 1.8 | 0.91 (value relative to Comparative Example 2) |
| Comparative Example 3 | Al Powder (99.9% purity) | 0 | Iodine | 0 | n/a |

*1Carbon Nanotubes

<Amount of Dopants Doped into Doped Carbon Nanotubes>

An amount of the dopants doped into the doped carbon nanotubes included in the carbon nanotube composite material was measured by ICP-MS. The doped carbon nanotubes in the carbon nanotube composite material of Example 1 included 1.5 parts by mass of iodine as the dopants relative to 100 parts by mass of the carbon nanotubes. The measurement results are shown in Table 1. Incidentally, as described above, the doped carbon nanotubes forming the electrolytically-treated Buckypaper 40 as a material of the carbon nanotube composite material were so rich in iodine that 10 parts by mass of iodine adhered to 100 parts by mass of the carbon nanotubes. The reason for this is that more of iodine was made to adhere to the carbon nanotubes with it taken into consideration that there was likelihood that some of iodine came off the doped carbon nanotubes while the iodine-doped Buckypaper 40 was being made into powder of the doped carbon nanotubes.

<Electrical Conductivity>

An electrical conductivity of the obtained carbon nanotube composite material was evaluated in accordance with JIS C3002. The electrical conductivity was calculated from the resistivity of the carbon nanotube composite material which was obtained by being measured using a four-terminal method in a constant-temperature chamber thermostated at 20° C. (±0.5° C.). The inter-terminal distance employed to measure the resistivity was set at 1000 mm. Incidentally, the electrical conductivity is shown as a relative electrical conductivity when the electrical conductivity of Comparative Example 1 is regarded as 1.00, which is a carbon nanotube composite material produced with the same conditions as was the carbon nanotube composite material of Example 1 except that the undoped carbon nanotubes were used instead of the doped carbon nanotubes. The relative electrical conductivities are shown in Table 1.

Comparative Example 1

The carbon nanotube composite material of Comparative Example 1 was produced in the same manner as was the carbon nanotube composite material of Example 1 except that the undoped carbon nanotubes were used instead of the doped carbon nanotubes. The obtained carbon nanotube composite material was evaluated in the same manner as was the carbon nanotube composite material of Example 1. The result of the measurement is shown in Table 1.

Examples 2 and 3

The carbon nanotube composite materials of Examples 2 and 3 were produced in the same manner as was the carbon nanotube composite material of Example 1 except that as shown in Table 1, the amount of the doped carbon nanotubes in the carbon nanotube composite material of each of Examples 2 and 3, and the amount of the dopants in the doped carbon nanotubes of each of Examples 2 and 3 were different from those of Example 1. The obtained carbon nanotube composite materials were evaluated in the same manner as was the carbon nanotube composite material of Example 1. The results of the measurement are shown in Table 1. Incidentally, the electrical conductivity of each of Examples 2 and 3 is shown as a relative electrical conductivity when the electrical conductivity of Comparative Example 2 is regarded as 1.00, which is a carbon nanotube composite material produced with the same conditions as was the carbon nanotube composite material of Examples 2 and 3 except that the undoped carbon nanotubes were used instead of the doped carbon nanotubes.

Comparative Example 2

The carbon nanotube composite material of Comparative Example 2 was produced in the same manner as was the carbon nanotube composite material of Example 2 except that the undoped carbon nanotubes were used instead of the doped carbon nanotubes. The obtained carbon nanotube composite material was evaluated in the same manner as was the carbon nanotube composite material of Example 1. The result of the measurement is shown in Table 1.

Examples 4 to 6

The carbon nanotube composite materials of Examples 4 to 6 were produced in the same manner as was the carbon nanotube composite material of Example 1 except that as shown in Table 1, the amount of the doped carbon nanotubes in the carbon nanotube composite material of each of Examples 4 to 6, and the amount of the dopants in the doped carbon nanotubes of each of Examples 4 to 6 were different from those of Example 1. The obtained carbon nanotube composite materials were evaluated in the same manner as was the carbon nanotube composite material of Example 1. The results of the measurement are shown in Table 1. Incidentally, the electrical conductivity of each of Examples 4 to 6 is shown as a relative electrical conductivity when the electrical conductivity of Comparative Example 2 is regarded as 1.00.

Comparative Example 3

A metal material made from aluminum only was produced in the same manner as was the carbon nanotube composite material of Example 1 except that no doped carbon nanotubes were used. The obtained metal material was evaluated in the same manner as was the carbon nanotube composite material of Example 1. The result of the measurement is shown in Table 1.

Figure 11:
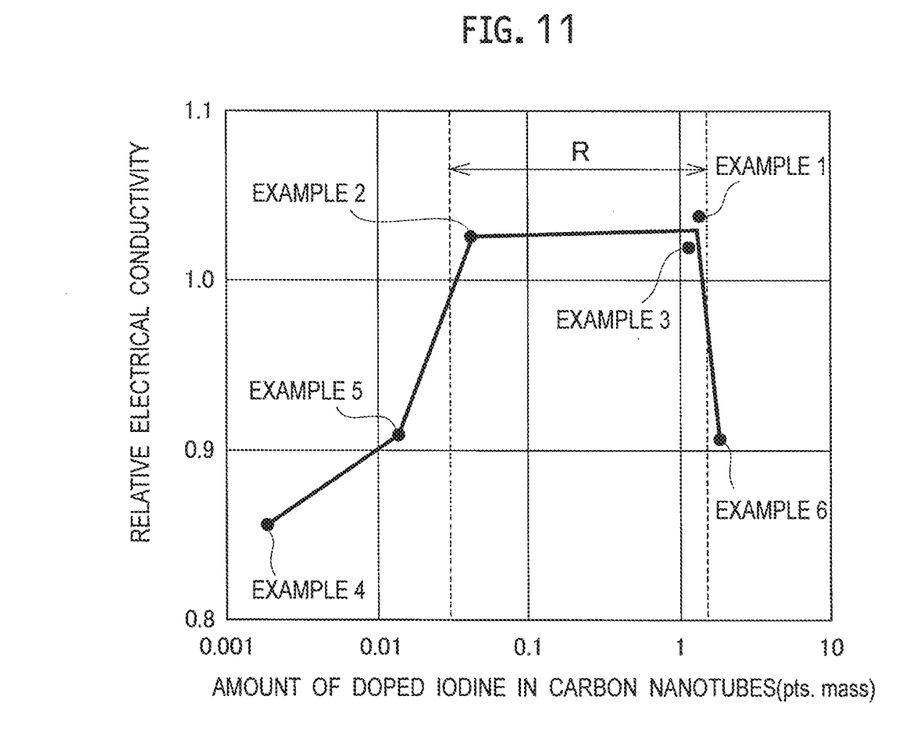
FIG. 11 is a graph showing a relationship between an amount of iodine doped into doped carbon nanotubes and a relative electrical conductivity of the carbon nanotube composite material.

FIG. 11 shows results of the measurement of the relative electrical conductivities of Examples 1 to 6. From FIG. 11, it is learned that the relative electrical conductivities of the carbon nanotube composite materials in which the amount of the dopants (iodine) in the doped carbon nanotubes is within a range indicated with the letter R in FIG. 11, or the range of 0.04 to 1.6 parts by mass, are higher than those of the other carbon nanotube composite materials.

Although the present invention has been described using the embodiment, the present invention is not limited to the embodiment, and may be variously modified within the gist of the present invention.

The carbon nanotube composite material of the embodiment is usable, for example, as a wire for an automobile harness.

What is claimed is:

1. A carbon nanotube composite material comprising:
a metal base material made from a polycrystalline substance in which a plurality of metal crystal grains with a rod shape are oriented in a direction; and
carbon nanotube electrically-conductive path portions made from doped carbon nanotubes having a dopant, existing in parts of grain boundaries between the metal crystal grains with the rod shape in a cross section of the metal base material, and forming an electrically-conductive path which is electrically conductive in a longitudinal direction of the metal base material, by existing along the longitudinal direction, wherein in the cross section of the metal base material, the carbon nanotube electrically-conductive path portions exist in parts of the grain boundaries between the rod-shaped metal crystal grains, but not in all of the grain boundaries.

2. The carbon nanotube composite material according to claim 1, wherein the dopant is at least one dopant selected from the group consisting of a halogen element-containing substance, an alkali metal-containing substance, and a metal oxide.

3. The carbon nanotube composite material according to claim 2, wherein the halogen element-containing substance is
at least one element selected from the group consisting of fluorine, chlorine, bromine and iodine,
ions of the at least one element, or
molecules or a chemical compound including the at least one element.

4. The carbon nanotube composite material according to claim 2, wherein the alkali metal-containing substance is
at least one element selected from the group consisting of lithium, sodium, potassium, rubidium and cesium,
ions of the at least one element, or
molecules or a chemical compound including the at least one element.

5. The carbon nanotube composite material according to claim 2, wherein the metal oxide is at least one oxide selected from the group consisting of iron oxide, copper oxide, titanium oxide, zinc oxide, molybdenum oxide, and calcium oxide.

6. The carbon nanotube composite material according to claim 1, wherein the doped carbon nanotubes include 0.04 to 1.6 parts by mass of the dopant relative to 100 parts by mass of the doped carbon nanotubes.

7. The carbon nanotube composite material according to claim 1, wherein the dopant included in the doped carbon nanotubes is made to adhere to or to be contained in the carbon nanotubes.

8. The carbon nanotube composite material according to claim 1, wherein the carbon nanotube composite material includes 0.1 to 1 part by mass of the carbon nanotube electrically-conductive path portions relative to 100 parts by mass of the metal base material.

9. The carbon nanotube composite material according to claim 1, wherein the plurality of metal crystal grains with the rod shape are made of aluminum,
wherein the dopant is iodine,
herein the amount of the carbon nanotube included in the metal base material is 0.1 to 1 part by mass,
wherein the doped carbon nanotubes include 0.04 to 1.6 parts by mass of the dopant relative to 100 parts by mass of the doped carbon nanotubes.

10. The carbon nanotube composite material according to claim 9, wherein the amount of the doped carbon nanotubes included in the metal base material is 0.2 to 1 part by mass.

* * * * *